(12) United States Patent
Lewis et al.

(10) Patent No.: US 8,776,754 B2
(45) Date of Patent: Jul. 15, 2014

(54) METHOD AND SYSTEM FOR ADJUSTING PORT THROTTLES

(75) Inventors: Donald J. Lewis, Beaverton, OR (US); Thomas G. Leone, Ypsilanti, MI (US); Ralph Wayne Cunningham, Milan, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 512 days.

(21) Appl. No.: 13/227,680

(22) Filed: Sep. 8, 2011

(65) Prior Publication Data

US 2013/0066540 A1    Mar. 14, 2013

(51) Int. Cl.
*F02M 1/08* (2006.01)
*F02D 9/02* (2006.01)

(52) U.S. Cl.
CPC ... *F02D 9/02* (2013.01); *F02M 1/08* (2013.01)
USPC ..................... 123/179.4; 123/179.18; 123/336

(58) Field of Classification Search
CPC ......... F02D 9/00; F02D 9/02; F02D 41/0002; F02D 41/067; F02M 35/10255; F02M 1/08; F02M 1/02; F02N 19/001
USPC .................. 123/308, 336, 337, 403, 404, 376, 123/179.16, 179.18, 437–438, 442, 179.4
See application file for complete search history.

(56) References Cited

U.S. PATENT DOCUMENTS

| | | | |
|---|---|---|---|
| 4,445,480 A * | 5/1984 | Inoue et al. ................... 123/432 |
| 5,542,388 A | 8/1996 | Ichinose et al. |
| 5,596,957 A | 1/1997 | Ichinose et al. |
| 5,632,249 A | 5/1997 | Sadakane et al. |
| 5,722,365 A * | 3/1998 | Sadakane et al. ............. 123/336 |
| 6,543,220 B2 | 4/2003 | Yoshida et al. |
| 6,622,486 B2 | 9/2003 | Järvi |
| 6,622,695 B2 * | 9/2003 | Kondo .......................... 123/336 |
| 6,675,768 B2 | 1/2004 | Kanai |
| 6,915,788 B2 | 7/2005 | Nakamura |
| 7,121,258 B2 * | 10/2006 | Nakamoto et al. ............. 123/399 |
| 7,296,550 B2 * | 11/2007 | Trask et al. .............. 123/179.18 |
| 7,347,183 B2 | 3/2008 | Tabata et al. |
| 8,176,904 B2 * | 5/2012 | Shiomi et al. ................. 123/585 |
| 8,392,097 B2 * | 3/2013 | Ma et al. ........................ 701/113 |
| 2003/0217739 A1 | 11/2003 | Saeki et al. |
| 2004/0237931 A1 | 12/2004 | Okamoto et al. |
| 2008/0184705 A1 | 8/2008 | Dumas et al. |

FOREIGN PATENT DOCUMENTS

| | | |
|---|---|---|
| EP | 0573895 A1 | 12/1993 |
| EP | 1306829 A2 | 5/2003 |
| JP | 8109836 A | 4/1996 |

OTHER PUBLICATIONS

Kapus, P.E. et al., "Ethanol Direct Injection on Turbocharged SI Engines—Potential and Challenges," SAE Technical Paper Series 011408, World Congress, Detroit, MI., Apr. 16-19, 2007, 11 pages.
Colpin, C. et al., "Key Parameters for Startability Improvement Applied to Ethanol Engines," SAE Technical Paper Series No. 010616, Renault SAS, 2009, 9 pages.

(Continued)

*Primary Examiner* — Thomas Moulis
(74) *Attorney, Agent, or Firm* — Julia Voutyras; Alleman Hall McCoy Russell & Tuttle LLP

(57) ABSTRACT

An engine system and method for improving engine starting are disclosed. In one example, two engine cylinder port throttles are adjusted differently during engine starting. The system and method may improve engine torque control during an engine start.

20 Claims, 6 Drawing Sheets

(56) References Cited

OTHER PUBLICATIONS

Nakajima, Susumu, "Research into Optimal Specifications for Flexible Fuel Vehicle Engines," SAE Technical Paper Series No. 011097, Honda R&D Co., Ltd, 2010, 10 pages.

Colli, Gustavo Beira et al., "Heated Injector Cold Start System for Flex-Fuel Motorcycles," SAE Technical Paper Series No. 360156, Congresso 2010 SAE Brasil, São Paulo, Brasil, Oct. 5-7, 2010, 19 pages.

Leone, Thomas G. et al., "Pulsation Absorption System for an Engine," U.S. Appl. No. 13/290,728, filed Nov. 7, 2011, 31 pages.

Leone, Thomas G. et al., "Method and System for Sampling Intake Manifold Pressure," U.S. Appl. No. 13/231,170, filed Sep. 13, 2011, 39 pages.

Leone, Thomas G. et al., "Method and System for Improving Engine Starting," U.S. Appl. No. 13/326,150, filed Dec. 14, 2011, 48 pages.

Leone, Thomas G., "Method and System for Improving Engine Starting," U.S. Appl. No. 13/227,670, filed Sep. 8, 2011, 36 pages.

\* cited by examiner

METHOD AND SYSTEM FOR ADJUSTING PORT THROTTLES

BACKGROUND/SUMMARY

Engine emissions may change from one engine start to another when engine speed during engine run-up changes from start to start. If engine speed increases or decreases from an expected engine speed during engine starting, engine cylinder air-fuel mixtures may change such that engine torque and emissions change. Therefore, it may be desirable to control engine speed such that engine speed is more consistent from engine start to engine start. One way to improve engine speed control during an engine start is to provide consistent cylinder air charges between different engine starts. However, it may be difficult to provide consistent cylinder air charges between engine starts due to fixed timing constraints between crankshaft and camshaft timing.

The inventors herein have recognized the above-mentioned limitations and have developed a method for adjusting engine port throttles, comprising: positioning an air inlet throttle of an engine; adjusting a first port throttle in a first position, the first port throttle located downstream of the air inlet throttle; adjusting a second port throttle in a second position, different than the first position, the second port throttle located downstream of the air inlet throttle; and starting an engine after positioning the first and second port throttles.

By individually adjusting port throttles during engine starting, it may be possible to provide more consistent cylinder air charges between engine cylinders during engine starting. For example, different port throttles of an engine may be adjusted to different positions during an engine start so as to regulate air entering cylinders based on intake manifold pressure, port throttle position, and cylinder intake valve timing. Consequently, an amount of air entering a particular cylinder may be adjusted by changing the position of the port throttle. In this way, individual cylinder air amounts may be controlled even though intake valve timing between cylinders is substantially the same.

The present description may provide several advantages. For example, the approach may provide more precise control of engine speed, air charge, and air-fuel ratio from engine start to engine start. Further, individual control of engine cylinder port throttles may improve engine position control during engine stopping. Additionally, the approach may provide cylinder air charge control for engines having fixed valve timing that approaches that of engines having valves that are adjustable independent of crankshaft position.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
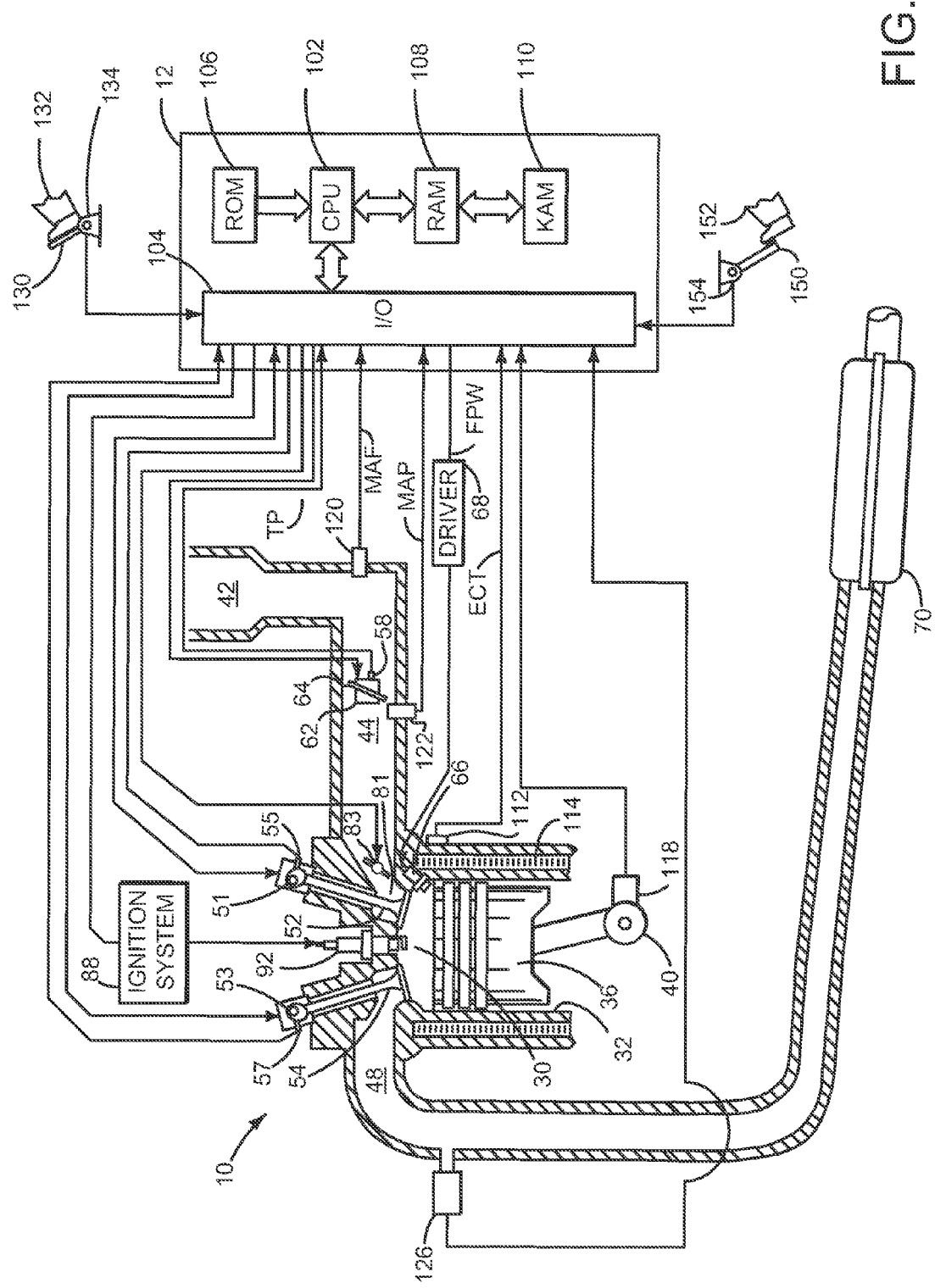
FIG. 1 shows a schematic depiction of an engine.
Figure 2:
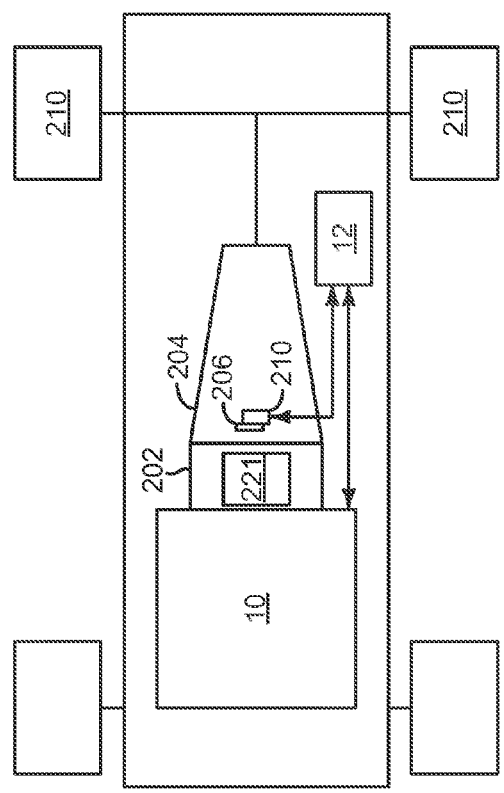
FIG. 2 shows a schematic depiction of a vehicle.
Figure 3:
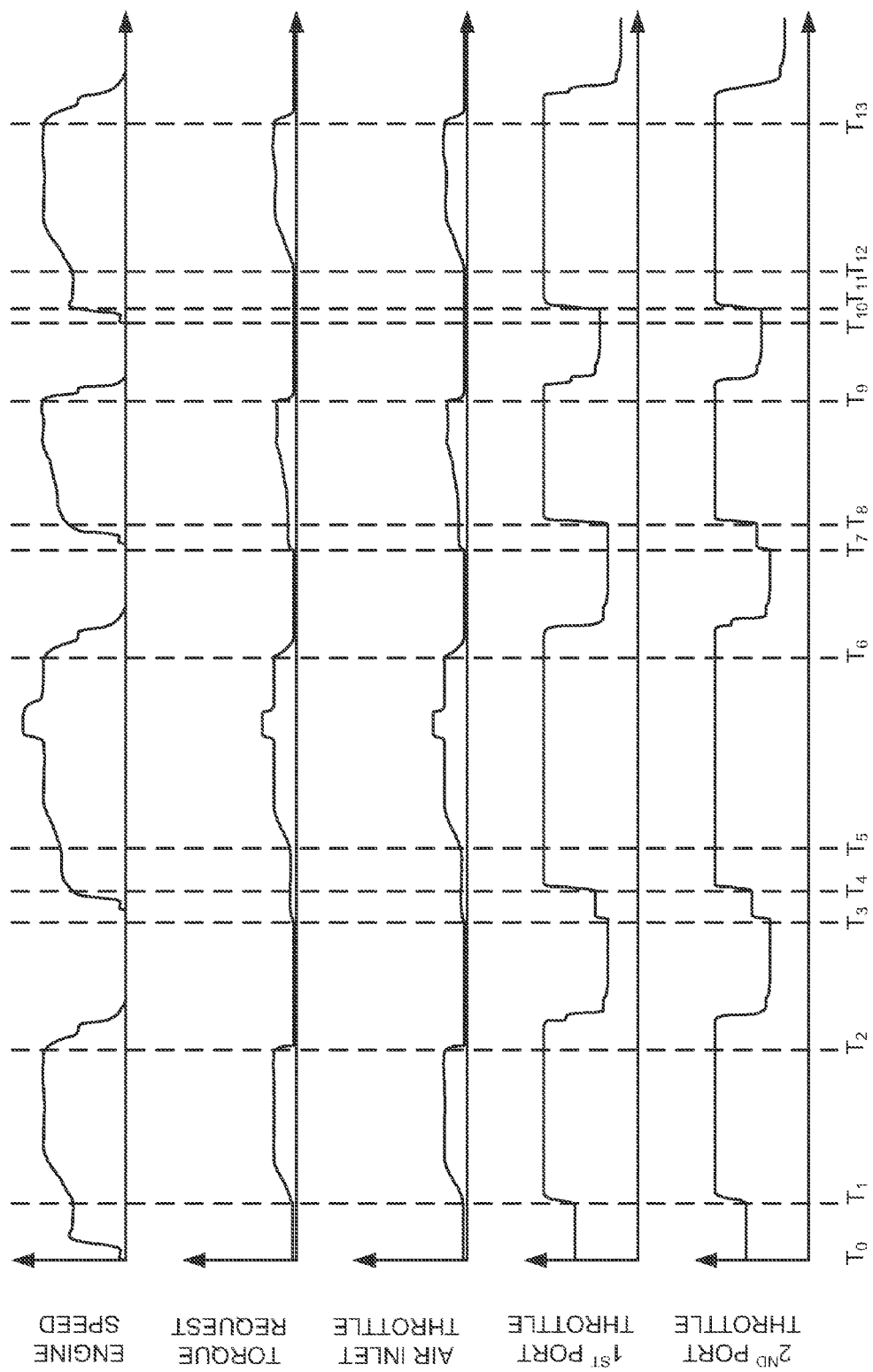
FIGS. 3 and 4 show a simulated example of an engine operating sequence during operator directed and automatic engine starting.
Figure 4:
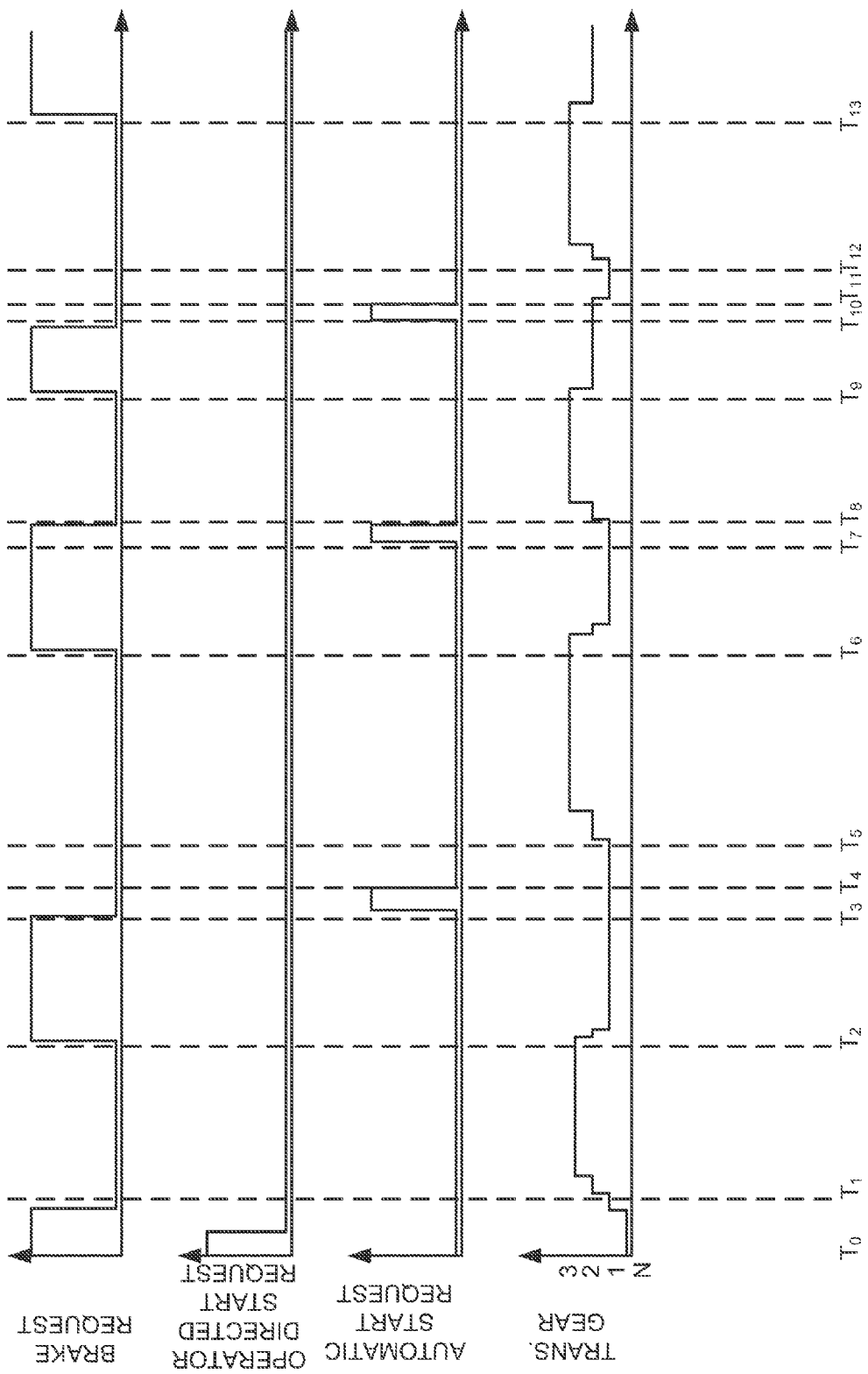

The present description is related to controlling port throttles of an engine placed in a vehicle as illustrated in FIGS. 1 and 2. In one example, port throttles are adjusted differently for automatic engine starts and operator directed engine starts as illustrated in FIGS. 3 and 4. Port throttles may be controlled according to the method of FIG. 5 to provide the sequence illustrated in FIGS. 3 and 4.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail (not shown). Fuel injector 66 is supplied operating current from driver 68 which responds to controller 12. In addition, intake manifold 44 is shown communicating with optional electronic throttle 62 which adjusts a position of throttle plate 64 to control air flow from engine air intake 42. In some examples, electronic throttle 62 may be eliminated. Port throttle 83 controls air flow into cylinder 30 via restricting or opening intake port 81. In engines with a plurality of cylinders a plurality of individually controlled port throttles may be provided so that port throttle of a first cylinder may be positioned differently from port throttles of another cylinder.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Vehicle brakes may be applied when foot 152 depresses brake pedal 150. Brake pedal position sensor 154 indicates the position of brake pedal 150 and may be used to determine whether or not vehicle brakes are applied.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by foot 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle. The hybrid vehicle may have a parallel configuration, series configuration, or variation or combinations thereof. Further, in some embodiments, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples.

Referring now to FIG. 2, a schematic depiction of a vehicle including the engine 10 of FIG. 1 is shown. Vehicle 200 includes engine 10 coupled to a transmission 204 via a torque converter 202. Engine 10 provides torque to vehicle wheels 210 via transmission 204 and through torque converter 202. Controller 12 receives signals from and provides control signals to engine 10 and transmission 204. Controller 12 actuates torque converter lock-up clutch 221, and gears 206 that are selectable via clutches 210. In one example, clutches 210 are hydraulically operated.

The system of FIGS. 1 and 2 provides for controlling an engine, comprising: a first engine cylinder port throttle located along an engine air intake passage regulating air flow solely to a first cylinder; a second engine cylinder port throttle located along an engine air intake passage regulating air flow solely to a second cylinder; and a controller including instructions for adjusting a position of the engine air intake throttle, the controller including further instructions for adjusting the first engine cylinder port throttle to a first position during an operator directed engine start, the controller also including instructions for adjusting the second engine cylinder port throttle to a second position during the operator directed engine start, the second position different from the first position. Thus, the system includes port throttles each of which independently regulate air flow to an individual cylinder. The system further comprises an engine air intake throttle located along an engine air intake passage for regulating air flow to the first and second engine cylinder port throttles, and where the position of the engine air intake throttle is adjusted based on barometric pressure. The system further comprises additional controller instructions for adjusting the first engine cylinder port throttle and the second engine cylinder port throttle to a same position after engine start. The system further comprises additional controller instructions for adjusting the first engine cylinder port throttle and the second engine cylinder port throttle in response to engine speed and engine load after the first and second engine cylinder port throttles are adjusted to the same position. The system also includes where the controller includes further instructions for adjusting the first engine cylinder port throttle and the second engine cylinder port throttle to different positions in response to an automatic engine start. The system also includes where the controller includes further instructions for opening the first engine cylinder port throttle further during the operator directed start than during the automatic engine start.

Referring now to FIGS. 3 and 4, a simulated engine operating sequence is illustrated. The sequence of FIGS. 3 and 4 may be provided via the system of FIGS. 1 and 2 by way of controller 12 executing instructions of the method of FIG. 5. FIGS. 3 and 4 represent operating signals during a same operating sequence. Therefore, vertical time markers $T_0$-$T_{13}$ represent the same times in both of FIGS. 3 and 4.

The first plot from the top of FIG. 3 represents engine speed versus time. The Y axis represents engine speed and engine speed increases in the direction of the Y axis arrow. The X axis represents time and time increases from the left hand side of FIG. 3 to the right hand side of FIG. 3.

The second plot from the top of FIG. 3 represents engine torque request versus time. The Y axis represents engine torque request and engine torque request increases in the direction of the Y axis arrow. The X axis represents time and time increases from the left hand side of FIG. 3 to the right hand side of FIG. 3.

The third plot from the top of FIG. 3 represents position of engine air inlet throttle versus time. The Y axis represents position of an engine air inlet throttle and opening amount of the engine air inlet throttle increases in the direction of the Y axis arrow. The X axis represents time and time increases from the left hand side of FIG. 3 to the right hand side of FIG. 3.

The fourth plot from the top of FIG. 3 represents position of a first engine port throttle versus time. The Y axis represents position of the first engine port throttle and opening amount of the first engine port throttle increases in the direction of the Y axis arrow. The X axis represents time and time increases from the left hand side of FIG. 3 to the right hand side of FIG. 3.

The fifth plot from the top of FIG. 3 represents position of a second engine port throttle versus time. The Y axis represents position of the second engine port throttle and opening amount of the second engine port throttle increases in the direction of the Y axis arrow. The X axis represents time and time increases from the left hand side of FIG. 3 to the right hand side of FIG. 3.

The first plot from the top of FIG. 4 represents vehicle brake request versus time. The Y axis represents vehicle brake request and vehicle brake request increases in the direction of the Y axis arrow. The X axis represents time and time increases from the left hand side of FIG. 4 to the right hand side of FIG. 4.

The second plot from the top of FIG. 4 represents an indication or absence of an indication of an operator directed engine start request. An operator directed engine start request is indicated when the signal is at a higher level. Absence of an operator directed engine start request is indicated when the signal is at a lower level. A lower level operator directed engine start signal is near the X axis. The X axis represents time and time increases from the left hand side of FIG. 4 to the right hand side of FIG. 4.

The third plot from the top of FIG. 4 represents an indication or absence of an indication of an automatic engine start request. An automatic engine start request is indicated when the signal is at a higher level. Absence of an automatic engine start request is indicated when the signal is at a lower level. A lower level automatic engine start signal is near the X axis. The X axis represents time and time increases from the left hand side of FIG. 4 to the right hand side of FIG. 4.

The fourth plot from the top of FIG. 4 represents transmission gear of a transmission coupled to the engine. Neutral in indicated by N along the Y axis and gears 1-3 are indicated by appropriate numbers. The Y axis represents transmission gear and the gear numbers increase in the direction of the Y axis arrow. The X axis represents time and time increases from the left hand side of FIG. 4 to the right hand side of FIG. 4.

At time $T_0$, engine cranking begins in response to an operator directed engine start request. The engine speed begins to increase and the operator directed engine start signal is at an elevated level. The vehicle brake is also applied and the transmission is in neutral. In some examples, an operator directed engine start request may only be allowed when the transmission is in neutral or park. The engine torque request is also low at time $T_0$ and the engine air inlet throttle is closed to a lower opening amount. The first and second port throttles are opened to a middle level so as to provide some restriction to air entering the cylinder ports. The first and second port throttle positions may be further adjusted during operator directed engine starts to account for changes in engine temperature and friction. For example, engine port throttle opening amounts can be increased as engine temperature at time of start decreases so as to accelerate a cold engine with higher friction.

Between time $T_0$ and time $T_1$, the engine is started and achieves idle speed. The operator directed starting signal also transitions to a lower level indicating an end to the operator directed engine start request. The brake request is also removed so that the vehicle may travel forward and the transmission is transitioned from neutral to first gear.

At time $T_1$, the engine torque request is increased by the vehicle operator or a hybrid controller so that the vehicle can accelerate. The engine air inlet throttle opening is also increased so that additional air is provided to the engine, thereby providing increased engine torque. The first and second port throttles are fully opened so as to reduce restriction of the cylinder inlet ports. By increasing the opening of the engine air inlet throttles and port throttles, engine torque output can be increased.

Between time $T_1$ and time $T_2$, the engine and vehicle accelerate. As the vehicle accelerates, the transmission shifts from first gear up to third gear. The engine speed stabilizes at a higher level and the engine torque request and opening amount of the port throttles remain substantially constant near time $T_2$.

At time $T_2$, the engine torque request is reduced and the engine speed begins to fall with the reduced engine torque demand. The engine air inlet throttle opening amount is also decreased as the engine torque request is decreased. In some examples, the low engine torque demand also allows the first and second port throttles to partially close since engine and cylinder air amount is reduced. In this example, the engine torque request is reduced to a low level but the port throttles are held in the fully open position until the engine stop request (not shown) during the engine idle period is initiated.

Engine speed is reduced between time $T_2$ and time $T_3$ as the vehicle is stopped. The engine briefly idles and then is subsequently automatically stopped after the vehicle stops. In one example, the engine may be automatically stopped when the vehicle brake is applied, when vehicle speed is less than a threshold level, and when the engine torque request is less than a threshold level. Further, additional conditions may be required to automatically stop the engine.

The vehicle brakes are also applied during the period between time $T_2$ and time $T_3$. The vehicle brake can be applied to keep the vehicle still while the vehicle is stopped and to keep the engine off since the engine may be restarted if the vehicle brake is released. It should be noted that where an actuator provides more than one unrelated or loosely related function (e.g., a brake pedal for vehicle braking and condition for engine restart as opposed to a key for starting and stopping the engine), adjustment of the actuator by the vehicle operator does not constitute an operator directed engine start request. The transmission is also downshifted from third gear to first gear between time $T_2$ and time $T_3$.

Upon an indication of an engine stop request via a driver or an engine controller, the first and second port throttles are individually repositioned as indicated by the first and second port throttle signals so as to influence where the engine stops. As such, the first and second port throttles exhibit different trajectories after an engine stop request. In one example, a controller determines the stroke of a cylinder (e.g., cylinder number one) where the engine stop request is made. The controller adjusts the positions of port throttle of this cylinder and each port throttle of the other cylinders based on the stoke of the cylinder where the engine stop request occurred.

For example, if an engine stop request is initiated during the compression stroke of cylinder number one of a four cylinder engine, the port throttle of cylinder number three may be kept in its present position (e.g., fully open) so as not to disturb the air-fuel mixture of the subsequently combusting cylinder. The port throttle of cylinder number four may be at least partially closed and the port throttle of cylinder number two may be closed even further so as to reduce the air charges of cylinders number four and two thereby affecting the engine stopping position. The port throttle of cylinder number one may be fully closed or closed further than the port throttles of cylinders number four and two so as to limit the air flowing into cylinder number one during its next cycle.

On the other hand, if an engine stop request is initiated during an exhaust stroke of cylinder number one of a four cylinder engine, the port throttle of cylinder number three may be moved to a partially closed position so as to reduce the air-fuel mixture amount during a subsequent cylinder cycle. The port throttle of cylinder number three may be at least closed further than the port throttle of cylinder number one and the port throttle of cylinder number four may be closed even further than the port throttle of cylinder number two. The port throttle of cylinder number two may be kept in its position or fully opened so that the air-fuel mixture of cylinder number two during the present cylinder cycle is not affected by the engine stop request.

In one example, port throttle positions for each port throttle of engine cylinders is mapped and stored in memory. The port throttle positions may be empirically determined so as to provide a desired engine stopping position after an engine stop request. For example, an engine may be stopped multiple times with an engine stop request that is initiated during a compression stroke of a particular cylinder. The port throttle positions of each cylinder may be adjusted until the engine stops repeatably in a desired position (e.g., during compression stroke of cylinder number one) with selected port throttle positions. The port throttle positions are stored in memory and retrieved during subsequent engine stops to control engine stopping.

The positions of each port throttle may be repositioned independently after the engine stops for a subsequent engine restart. For example, the first port throttle is shown more closed than the second port throttle because the cylinder receiving air from the first port throttle is predicted to be the first cylinder to induct air from engine stop based on the engine stopping position. The first and second port throttles are prepositioned for a subsequent automatic engine start. For example, based on the transmission gear at engine stop, a position of the port throttles may be extracted from a table of empirically determined port throttle positions. Further, in this example, the first and second port throttle positions are based on the transmission being in first gear. In some examples, the first and second port throttles may also be adjusted just prior to engine cranking during an automatic engine start so that operating conditions that may have changed during the engine off state may be accounted for in the positioning of the first and second port throttles.

At time $T_3$, the vehicle brake is released as indicated by the brake request transitioning to a lower level. The engine is restarted automatically as the automatic start request signal transitions to a higher level. The operator directed start signal remains at a low level since the engine start is not operator directed. At substantially the same time, the engine torque request is increased by a small amount. The opening amounts of the first and second port throttle is also adjusted in response to the engine torque request. In this example, the first port throttle opening amount is increased by a first amount to allow additional air to enter engine cylinders, thereby providing additional vehicle launch torque as the engine runs-up. Since the driver is requesting increased engine torque at the time of start, it may be expected that the driver expects additional torque transfer to vehicle wheels during engine run-up. Additionally, the second port throttle opening amount is increased by an amount greater than the first port throttle opening amount to account for less air pressure in the engine intake manifold caused by air entering the cylinder in communication with the first port throttle.

In some examples, the port throttle positions may be adjusted in response to a counted number of cylinder events (e.g., combustion events or air induction events since the engine was stopped). By increasing the opening amount of the second port throttle, a cylinder in communication with the second port throttle may receive an air amount similar to the cylinder in communication with the first port throttle. Thus, in this example, the cylinder in communication with the first port throttle receives a first inducted amount of air related to the position of the first port throttle and engine intake manifold pressure (MAP). Subsequently, the cylinder in communication with the second port throttle receives a second inducted amount of air related to the position of the second port throttle and MAP, the second inducted amount substantially the same as the first inducted air amount or in proportion to the first inducted air amount. In this way, individual cylinders may receive substantially similar air amounts or air amounts in proportion to the first amount of air inducted to the first cylinder to induct air since engine stop during engine cranking and run-up.

At time $T_4$, engine speed reaches an engine idle speed and the first and second port throttles are substantially fully opened to allow engine torque to increase in response to the operator torque request. The automatic start request also transitions to a low level indicating that the engine is started. The engine torque request and the engine air inlet throttle positions remain substantially constant.

At time $T_5$, the engine torque request is increased causing the engine speed to increase as well as the engine air inlet throttle opening amount. The transmission shifts through gears as vehicle speed increases.

Between time $T_5$ and time $T_6$, engine speed and the engine torque request vary in response to operator demands. The engine air inlet throttle position also changes with the engine torque request.

At time $T_6$, the engine torque request is reduced and the engine speed begins to lower with the reduced engine torque demand. The engine air inlet throttle opening amount is also decreased as the engine torque request is decreased. The low engine torque demand also allows the first and second port throttle to partially close since engine and cylinder air amount is reduced. The first and second port throttles are held open until an engine stop request is provided.

Between time $T_6$ and time $T_7$, the engine speed is reduced until the vehicle is stopped where the engine briefly idles and then is subsequently automatically stopped. The first and second port throttles are adjusted to different positions in response to the request to stop the engine so as to influence engine stop position. The vehicle brakes are also applied during the period after time $T_6$, and the transmission is also downshifted from third gear to first gear after time $T_6$. The first and second port throttles are prepositioned for a subsequent automatic engine start. The first port throttle is closed further than the second port throttle since the cylinder receiving air via the first throttle is predicted to be the first cylinder to induct air since engine stop based on the engine stopping position. The first and second port throttles are also prepositioned for a subsequent automatic engine start based on the transmission being in first gear.

At time $T_7$, the engine torque request is increased causing the automatic engine start request to transition to a high level so that the engine is cranked and restarted. However, the vehicle brake is also applied when the engine torque request is increased. The position of the port throttles is reduced in response to vehicle brakes being applied so as to limit engine torque. Thus, where there may be conflicting requirements between a vehicle brake request and engine torque request, the first and second port throttle openings can be reduced as compared to similar condition except where the vehicle brake is not applied. In this way, engine torque can be limited via the first and second port throttles. The port throttles may also be adjusted based on a counted number of cylinder events.

At time $T_8$, the engine speed reaches a desired engine speed and the vehicle brakes are released as indicated by the brake request transitioning to a lower state. Since the brake is released the port throttles can be opened to allow additional air to engine cylinders. Further, since the engine has reached idle speed the port throttles can be opened so that the engine responds quickly to the engine torque request. The automatic start request signal also transitions to a lower state when the engine speed reaches the idle speed. The engine torque request is also increased near time $T_8$ and the engine accelerates propelling the vehicle and causing the transmission to shift through gears.

At time $T_9$, the engine torque request is reduced and the engine speed begins to lower with the reduced engine torque demand. The engine air inlet throttle opening amount is also decreased as the engine torque request is decreased. The low engine torque demand also allows the first and second port throttle to partially close since engine and cylinder air amount is reduced. The first and second port throttles are held open until the engine stop request.

Between time $T_9$ and time $T_{10}$, the engine speed is reduced until the vehicle is stopped where the engine briefly idles and then is subsequently automatically stopped. The vehicle brakes are also applied during the period after time $T_9$, and the transmission is also downshifted from third gear to second gear after time $T_9$. The first and second port throttles are adjusted to different positions in response to the request to stop the engine so as to influence engine stop position. Further, the first and second port throttles are prepositioned for a subsequent automatic engine start. The first port throttle is closed further than the second port throttle since the cylinder receiving air via the first throttle is predicted to be the first cylinder to induct air since engine stop based on the engine stopping position. The first and second port throttles are also prepositioned for a subsequent automatic engine start based on the transmission being in second gear. The transmission may select different gears to be engaged during engine starting based on engine operating conditions. By selecting to leave the transmission in second gear, the engine may experience an increased perceived inertia as compared to when the engine is started while the transmission is in first gear. Therefore, in some examples, additional air can be provided to the engine cylinders by increasing the opening amount of the port throttles as is shown between time $T_9$ and time $T_{10}$ as compared to the time between $T_6$ and $T_7$. In other examples, the opening amount of the port throttles may be reduced for higher gear ratios and decreased for lower gear ratios. The brake is also released just prior to time $T_{10}$.

At time $T_{10}$, the automatic start request is transitioned to a higher level and engine cranking begins. The engine torque request and engine air inlet throttle position remain at their positions as there is no engine torque request from the vehicle operator. The first and second port throttles are shown set at a level higher than the levels set between time $T_6$ and time $T_7$ and remain at the higher level during engine cranking. The position of the first and second port throttles may be further adjusted in response to barometric pressure at time of start. In one example, barometric pressure is used to index a table of empirically determined port throttle offset values that are added to the base port throttle position in order to compensate for barometric pressure.

At time $T_{11}$, the speed of the engine reaches idle speed and the automatic start request is transitioned to a lower level. The transmission is also downshifted to first gear to improve vehicle acceleration and the port throttles are fully opened to allow engine torque to increase in anticipation of an operator increase the engine torque demand. The engine torque request is low since there is no operator request for torque. The engine air inlet throttle position is also low since there is no operator torque request.

At time $T_{12}$, the operator increases the engine torque request causing the engine speed to increase and the vehicle to accelerate. The transmission is upshifted in response to the increasing vehicle speed. The engine air inlet throttle opening is also increased to provide the engine additional air for increasing engine torque.

At time $T_{13}$, the engine torque request is reduced and the engine and vehicle begin to decelerate. The vehicle brake is applied shortly after time $T_{13}$ and the transmission is downshifted as vehicle speed decreases. The engine is also stopped shortly after time $T_{13}$. The first and second port throttles are adjusted independently to different positions in response to the request to stop the engine so as to influence engine stop position.

Figure 5:
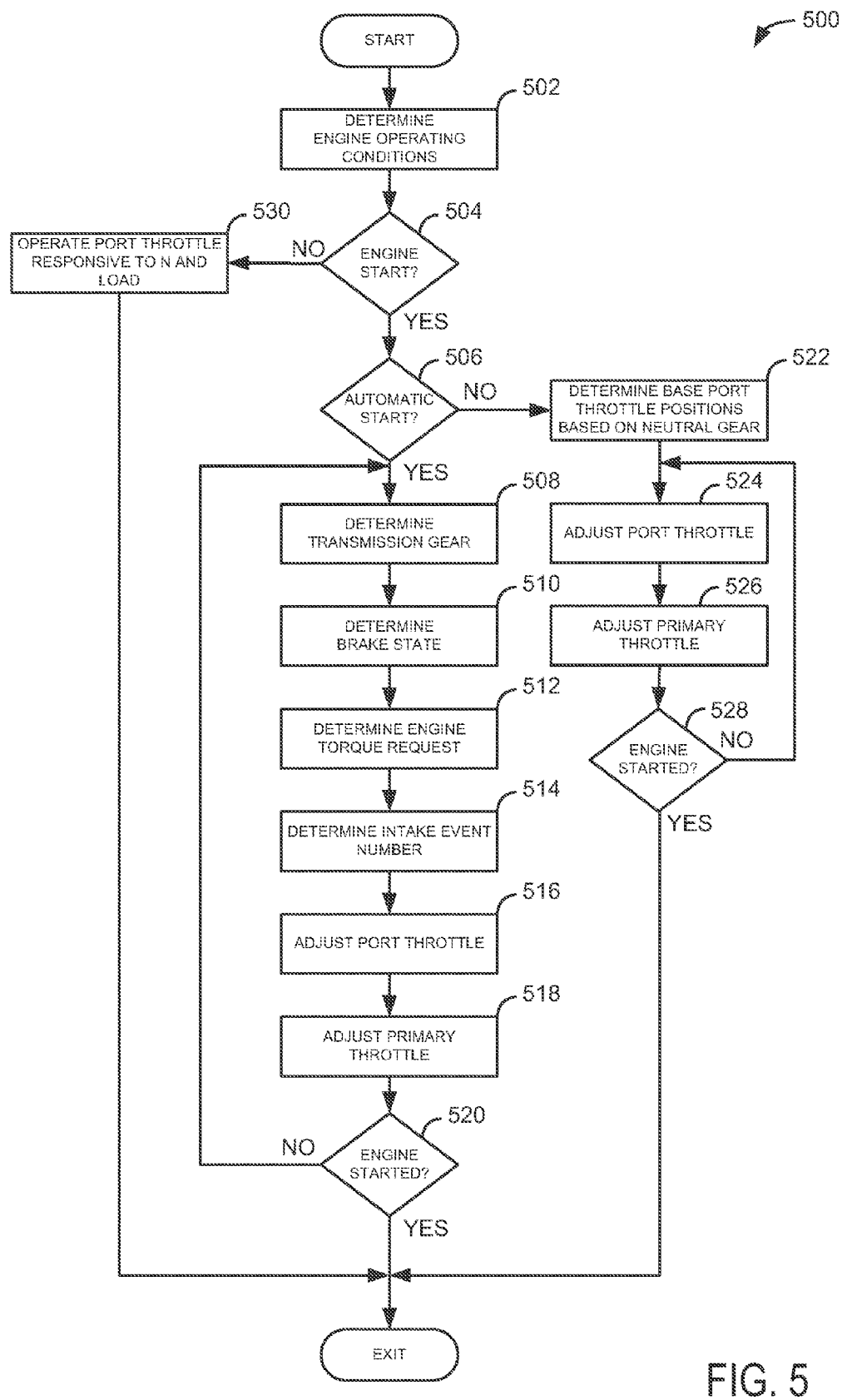
FIG. 5 shows a flowchart of an example method for operating an engine.

Referring now to FIG. 5, a flowchart of an example method for operating an engine is shown. The method of FIG. 5 may be executed via instructions of controller 12 in the system of FIGS. 1 and 2. Further, the method of FIG. 5 may provide at least a portion of the sequence illustrated in FIGS. 3 and 4.

At 502, method 500 determines engine operating conditions. Engine operating conditions may be determined via sensors and actuators illustrated in FIGS. 1 and 2. Engine operating conditions may include but are not limited to engine speed, engine load, engine temperature, transmission temperature, selected transmission gear, engaged transmission gear, and operator torque demand. Method 500 proceeds to 504 after engine operating conditions are determined.

At 504, method 500 judges whether or not the engine is presently being started. In one example, it may be determined that the engine is being started when a starter is engaged. In other examples, engine starting may be determined when the engine is being rotated via an external source such as an electric motor of a hybrid vehicle. In still other examples, engine starting may be indicated by initiation of fuel injection after an engine stop. If method 500 judges that the engine is being started, method 500 proceeds to 506. Otherwise, it is determined that the engine is not being started and method 500 proceeds to 530.

At 530, method 500 operates engine port throttles in response to engine speed and load. The engine system may include a plurality of port throttles directing air to a plurality of cylinders. Each of the plurality of port throttles may be individually controlled. For example, port throttles of some cylinders may be partially closed while port throttles of other cylinders may be fully open. Thus, air flow to different cylinders may be controlled in different ways. In one example, engine speed and load are used to index a table of empirically determined port throttle positions. The output of the table is a port throttle position that may be set by the controller. In addition, barometric pressure and engine air inlet temperature may be used to index tables that output offsets to further adjust the position of port throttles. For example, if engine air intake temperature increases port throttles may be opened further to compensate for the change in air density.

In one example, each port throttle is adjusted to the same position as the other port throttles after the engine reaches a predetermined operating condition. The predetermined operating condition may be an intake manifold pressure, engine speed, or time since engine stop. Further, each of the engine port throttles may be adjusting synchronously with the other port throttles of the engine. Method 500 proceeds to exit after the port throttle positions are adjusted.

At 506, method 500 determines whether or not the engine is being automatically started. An engine may be automatically started after being automatically stopped. In some examples an engine may be automatically started when an operator releases a vehicle brake pedal or depresses an accelerator pedal. If the engine is not being automatically started the engine is being started via an operator directed start since only automatic and operator directed engine starts are permitted. An operator directed start may be initiated by an operator requesting an engine start via an input that has a sole function of requesting an engine start for the operator (e.g., an engine starter switch). When a start is triggered by operator action other than through a dedicated input that has a sole function of requesting a start for an operator, the engine may be determined to be automatically started. For example, if an operator releases a brake pedal, the vehicle may automatically start and not operator directed to start. On the other hand, if the operator turns an engine start key to a start position, it may be determined that the engine is being started via an operator directed start. If method 500 determines the engine is being automatically started, method 500 proceeds to 508. Otherwise, method 500 proceeds to 522.

At 508, method 500 determines a presently engaged transmission gear. In some examples, a transmission gear may be determined to be engaged when a clutch is applied, and the clutch may be applied via supplying oil to the clutch. A clutch may be determined to be applied, and a gear to be engaged, when an oil pressure supplied to the clutch is greater than a threshold pressure. Alternatively, a clutch may be determined to be applied based on the state of a variable stored in the controller. Method 500 proceeds to 510 after the presently selected or engaged gear is determined.

At 510, method 500 determines a state of the vehicle brake. The state of the vehicle brake may be determined to be applied or not applied via a brake pedal sensor such as 154 of FIG. 1. Method 500 proceeds to 512 after the brake state is determined.

At 512, method 500 determines engine torque request. In one example, engine torque request may be determined via interrogating the output of accelerator pedal position sensor 134. The output of the accelerator pedal position sensor can be used to index a table or function that transforms the pedal position sensor output to an engine torque demand. Method 500 proceeds to 514 after the engine torque request is determined.

At 514, method 500 determines engine event number since engine stop. In one example, the engine events may be induction strokes of engine cylinders. In other examples, engine events may be combustion events or exhaust strokes. For example, if an engine is stopped and begins to rotate such that cylinder number one has inducted a fresh charge and cylinder number four is beginning to induct fresh charge, it may be determined that the engine is on a second event. In some examples, the first and subsequent induction strokes may be anticipated from engine position. For example, if engine position is such that cylinder number one of a four cylinder engine having a firing order of 1-3-4-2 is on an intake stroke at engine stop, it may be determined that the engine is at a first event and the second event will follow in cylinder three. In this way, cylinder events may be tracked.

At 516, engine port throttle are adjusted for the automatic start. In one example, a base position for each port throttle of the engine is determined. The base port throttle position may be based on engine temperature. For example, engine temperature may be used to index one or more tables of describing base port throttle positions.

An offset compensating for the presently engaged transmission gear is added to the base port throttle position. In one example, port throttles are opened further when higher gears are engaged (e.g., third gear) as compared to when lower gears are engaged (e.g., first gear). Thus, the base port throttle position is adjusted in response to the transmission gear that is presently engaged.

An offset compensating for the position of the vehicle brake pedal is also added to the base port throttle position. For example, if the brake pedal is depressed to a first position the base port throttle position is adjusted to close the port throttle opening amount to a first position. If the brake pedal is depressed to a second position, requesting additional vehicle brake force as compare to the first position, the based port throttle position is adjusted to close the port throttle opening to a second position less open than the first position. The brake pedal position is used to index a table or function of empirically determined port throttle adjustments. The output of the table or function is added to the base port throttle position.

An offset for compensating for engine torque demand is also added to the base port throttle opening amount. For example, if the accelerator pedal is depressed to a first position the base port throttle position is adjusted to open the port throttle opening amount to a first position. If the accelerator pedal is depressed to a second position, requesting additional engine torque as compared to the first position, the base port throttle position is adjusted to open the port throttle opening to a second position more open than the first position. The accelerator pedal position is used to index a table or function of empirically determined port throttle adjustments. The output of the table or function is added to the base port throttle position.

The base port throttle opening amount may also be adjusted based on a number of engine events. For example, a port throttle of a cylinder may be opened a predetermined amount for each induction event of the cylinder via an offset that can be added to the base port throttle position of the port throttle for each induction event of the cylinder. In another example, a port throttle of a cylinder may be opened a predetermined amount for each induction event of each engine cylinder via an offset that can be added to the base port throttle position of the port throttle for each engine induction event. Additionally, the base port throttle position opening amount can be increased as MAP decreases during engine starting. Further, the positions of port throttles may be adjusted responsive to engine speed during engine starting. For example, if engine speed is greater than desired engine speed, port throttles may be at least partially closed. If engine speed is less than desired engine speed, port throttle may be at least partially opened. It should be mentioned that the predetermined amounts mentioned above may vary depending on the engine event number and the predetermined amounts may be indexed in a table or function of empirically determined offsets amounts. In this way, port throttle position can be adjusted for cylinder events and/or MAP. Method 500 proceeds to 516 after transmission gear, brake state, torque request, and cylinder event number offsets have been added to the base port throttle positions.

Method 500 also adjusts the port throttle position of each port throttle. In some examples the port throttles may be adjusted for every engine event until a predetermined number of engine events are reached. In other examples, the port throttles may be adjusted at predetermined time intervals. The port throttles may be adjusted via adjusting a position of a motor or solenoid, or alternatively the port throttle positions may be pneumatically or hydraulically adjusted. The port throttles are adjusted to positions according to the base port throttle position plus the offsets. Method 500 proceeds to 518 after port throttle positions are adjusted.

At 518, the position of the primary throttle may be adjusted. In one example, the primary throttle position is adjusted based on air flow through the primary throttle. In other examples, the position of the primary throttle may be adjusted based on MAP. Further, the position of the primary throttle may be adjusted according to the engine torque demand. For example, if the engine torque demand increases, the engine air inlet throttle opening can be increased. Method 500 proceeds to 520.

At 520, method 500 judges whether or not the engine is started or at conditions to exit automatic starting port throttle control mode. In one example, the engine is started after engine speed exceeds idle speed. In other examples, method 500 may require engine speed to be within a predetermined speed range for a predetermined amount of time before proceeding to exit. If method 500 judges the engine is started or at conditions to exit automatic starting port throttle control mode, method 500 proceeds to exit. Otherwise, method 500 returns to 508.

At 522, method 500 determines base port throttle positions based on the engine being in neutral or park. When the engine is in neutral or park less inertia may be coupled to the engine so it may be desirable to reduce port throttle base opening amount. In one example, temperature and neutral gear are a basis for indexing a table or function of empirically determined base port throttle positions. The table or function is indexed and base port throttle positions are output. Further, the position of each port throttle may be adjusted for engine temperature, engine air temperature, and barometric pressure. Port throttle adjustments may be empirically determined and stored in controller memory to be indexed via the variable (e.g., engine temp., engine air temp.) affecting the port throttle adjustment. Method 500 proceeds to 524 after the base port throttle positions are determined.

At 524, engine port throttles are adjusted for the operator directed start. The base port throttle positions for the operator directed start may be opened further than for an automatic engine start under similar conditions. The port throttle may be opened further in an operator directed start so that the engine runs up at a faster rate. Further, since the vehicle is known to be in neutral or park, engine speed can increase without transferring engine torque to vehicle wheels. Additionally, the base port throttle position opening amount can be increased as MAP decreases. Further, the positions of port throttles may be adjusted responsive to engine speed. For example, if engine speed is greater than desired engine speed, port throttles may be at least partially closed. If engine speed is less than desired engine speed, port throttles may be at least partially opened.

In some examples the port throttles may be adjusted for every engine event until a predetermined number of engine events are reached. In other examples, the port throttles may be adjusted at predetermined time intervals. Port throttles are also adjusted in response to engine temperature and ambient temperature. For example, a function or table that outputs an adjustment based on engine temperature and ambient temperature modifies the port throttle positions at engine start. Method 500 proceeds to 526 after engine port throttles are adjusted.

At 526, method 500 adjusts the position of the primary throttle. The primary throttle position may be adjusted based on air flow through the primary throttle. In other examples, the position of the primary throttle may be adjusted based on MAP. Further, the position of the primary throttle may be adjusted according to the engine torque demand. Method 500 proceeds to 528 after the primary throttle position is adjusted.

At 528, method 500 judges whether or not the engine is started or at conditions to exit operator directed starting port throttle control mode. The engine may be considered started after engine speed exceeds idle speed. In other examples, method 500 may require engine speed to be within a predetermined speed range for a predetermined amount of time before proceeding to exit. If method 500 judges the engine is started or at conditions to exit operator directed engine starting port throttle control mode, method 500 proceeds to exit. Otherwise, method 500 returns to 524.

In this way, port throttles may be adjusted differently between operator directed engine starts and automatic engine starts so as to improve engine starting. Additionally, port throttles can be adjusted based on transmission gear, number of engine events, and state of vehicle brake to improve engine starting.

Figure 6:
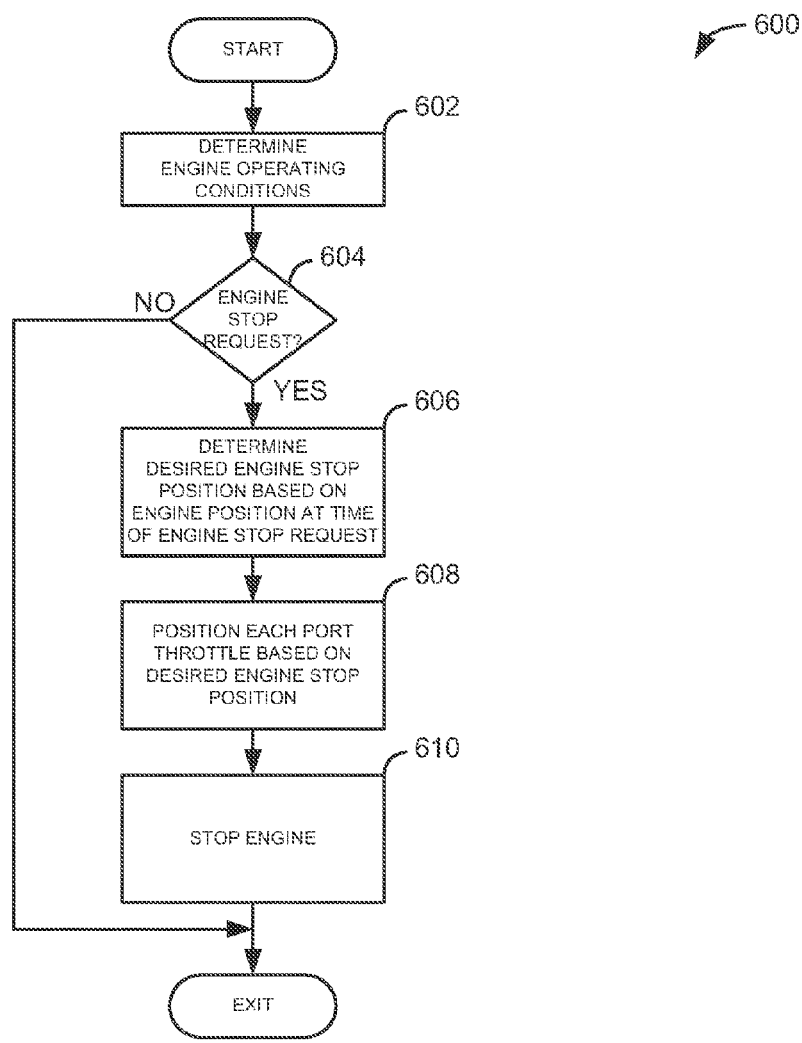
FIG. 6 shows a flowchart of an example method for stopping an engine.

Referring now to FIG. 6, a flowchart of an example method for stopping an engine is shown. The method of FIG. 6 may be executed via instructions of controller 12 in the system of FIGS. 1 and 2. Further, the method of FIG. 6 may provide at least a portion of the sequence illustrated in FIGS. 3 and 4.

At 602, method 600 determines engine operating conditions. Engine operating conditions may include but are not limited to requests for engine stop, engine position, engine temperature, barometric pressure, engine intake air temperature, engine speed, and engine load. Method 600 proceeds to 604 after engine operating conditions are determined.

At 604, method 600 judges whether or not there is an engine stop request. An engine stop request may be generated by an operator or by a controller. For example, an engine stop request may be initiated by an operator removing an ignition key or by an engine automatic stop/start controller. If method 600 judges an engine stop request is present, method 600 proceeds to 606. Otherwise, method 600 proceeds to exit.

At 606, method 600 determines a desired engine stop position based on engine position when the engine stop request was generated. Specifically, method 600 determines the engine stroke of a particular cylinder at the time the engine stop is requested. A desired engine stop position is extracted from a table of predetermined desirable engine stop positions. The desired engine stop positions may be based on considerations including which cylinder is desirable for a first combustion event, engine noise at engine start when starting from a particular engine position, and/or other factors. For example, if a request for engine stop is initiated during the compression stroke of cylinder number one, it may be determined desirable to stop the engine such that cylinder number one is on an intake stroke when the engine stops. Method 600 proceeds to 608 after the desired engine stop position is determined.

In other examples, method 600 may determine port throttle positions for a desired engine stop location based on stroke of a cylinder at the time the engine stop request. In one example, positions of each port throttle are extracted from a table of empirically determined port throttle positions based on the stroke of the cylinder at the time the engine stop request is generated. The port throttles are then positioned based on the positions which are stored in memory and indexed via the engine stroke at the time the request to stop is generated. It should also be mentioned that port throttles may be positioned based on a predetermined port throttle trajectory. For example, port throttles may be adjusted based on engine position or time since the engine stop is requested.

At 608, method 600 positions each port throttle based on the desired engine stop position. In one example, a table of port throttle positions is indexed according to the desired engine stop position. The table outputs a position for each port throttle. Further, each port throttle is adjusted to the individual position assigned to the port throttle from the table. In some examples, as discussed above, port throttles may be adjusted based on engine position or time since the engine stop is requested. In this way, the position of each port throttle may be adjusted during an engine stop. Method 600 proceeds to 610 after the engine port throttle positions are adjusted.

At 610, method 600 stops the engine. The engine may be stopped by ceasing fuel injection and/or spark of engine cylinders. The position of each port throttle may be further adjusted after engine stop in preparation for the next engine start. The position of each port throttle may be adjusted in response to the engine stop position, barometric pressure, engine temperature, etc. For example, at engine stop engine position may be determined and used to index a table of empirically determined port throttle positions in anticipation of a subsequent engine start. The position of each port throttle may be further adjusted in response to barometric pressure and ambient air temperature. In particular, if ambient air temperature increases, port throttle opening amount may be increased. If barometric pressure decreases, port throttle opening amount may be increased. Method 600 proceeds to exit after the engine is stopped and the port throttle positions are adjusted.

Thus, the methods of FIGS. 5 and 6 provide for a method for adjusting engine port throttles, comprising: adjusting a first port throttle to a first position, the first port throttle regulating air flow solely to a first cylinder of an engine; adjusting a second port throttle to a second position, different than the first position, the second port throttle regulating air flow solely to a second cylinder of the engine; and starting an engine after positioning the first and second port throttles. The method also includes where the first and second port throttles are located downstream of an engine air inlet throttle, and where the first and second positions are based on a desired engine stopping position. In one example, the method further comprises adjusting the first port throttle to a third position and adjusting the second port throttle to a fourth position, the fourth position different than the third position, in response to an engine stop request. The method also includes where the first and second cylinders including intake poppet valves. In another example, the method further comprises adjusting the first and second port throttles in response to ambient air temperature. The method further comprises adjusting the first and second port throttles in response to engine temperature.

The methods of FIGS. 5 and 6 provide for adjusting engine port throttles, comprising: positioning a first port throttle in a first position, the first port throttle regulating air flow solely to a first cylinder; positioning a second port throttle in a second position, different than the first position, the second port throttle regulating air flow solely to a second cylinder; starting an engine after positioning the first and second port throttles; and adjusting the second port throttle to a same position as the first port throttle. The method includes where the first port throttle and the second port throttle are located downstream of an air inlet throttle, and further comprising where the second port throttle is adjusted to the same position as the first port throttle in response to an engine operating condition. The method also includes where the engine operating condition is an engine speed or an intake manifold pressure. In one example, the method further comprises adjusting a position of the first or second port throttle in response to a number of engine events. The method also includes where the number of engine events is a number of engine combustion events since engine stop. The method includes where the first port throttle is further positioned during an engine start based on barometric pressure. The method further comprises adjusting the first port throttle in synchronization with adjusting the second port throttle after the second port throttle is adjusted to the same position as the first port throttle. The method also includes where the first port throttle and the second port throttle are adjusted to different positions during automatic and operator initiated engine starts.

As will be appreciated by one of ordinary skill in the art, the method described in FIGS. 5 and 6 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, single cylinder, I2, I3, I4, I5, V6, V8, V10, V12 and V16 engines operating on natural gas, gasoline, diesel, or alternative fuel configurations could use the present description to advantage.

The invention claimed is:

1. A method for adjusting engine port throttles, comprising:
   adjusting a first port throttle to a first position, the first port throttle regulating air flow solely to a first cylinder of an engine;
   adjusting a second port throttle to a second position, different than the first position, the second port throttle regulating air flow solely to a second cylinder of the engine; and
   starting an engine after positioning the first and second port throttles.

2. The method of claim 1, where the first and second port throttles are located downstream of an engine air inlet throttle, and where the first and second positions are based on a desired engine stopping position.

3. The method of claim 1, further comprising adjusting the first port throttle to a third position and adjusting the second port throttle to a fourth position, the fourth position different than the third position, in response to an engine stop request.

4. The method of claim 3, where the engine includes first and second cylinders downstream of the first and second port throttles, the first and second cylinders including intake poppet valves.

5. The method of claim 1, further comprising adjusting the first and second port throttles in response to ambient air temperature.

6. The method of claim 1, further comprising adjusting the first and second port throttles in response to engine temperature.

7. A method for adjusting engine port throttles, comprising:
   positioning a first port throttle in a first position, the first port throttle regulating air flow solely to a first cylinder;
   positioning a second port throttle in a second position, different than the first position, the second port throttle regulating air flow solely to a second cylinder;
   starting an engine after positioning the first and second port throttles; and
   adjusting the second port throttle to a same position as the first port throttle.

8. The method of claim 7, where the first port throttle and the second port throttle are located downstream of an air inlet throttle, and further comprising where the second port throttle is adjusted to the same position as the first port throttle in response to an engine operating condition.

9. The method of claim 8, where the engine operating condition is an engine speed or an intake manifold pressure.

10. The method of claim 7, further comprising adjusting a position of the first or second port throttle in response to a number of engine events.

11. The method of claim 10, where the number of engine events is a number of engine combustion events since engine stop.

12. The method of claim 7, where the first port throttle is further positioned during an engine start based on barometric pressure.

13. The method of claim 7, further comprising adjusting the first port throttle in synchronization with adjusting the second port throttle after the second port throttle is adjusted to the same position as the first port throttle.

14. The method of claim 7, where the first port throttle and the second port throttle are adjusted to different positions during automatic and operator initiated engine starts.

15. A system for controlling an engine, comprising:
a first engine cylinder port throttle located along an engine air intake passage regulating air flow solely to a first cylinder;
a second engine cylinder port throttle located along an engine air intake passage regulating air flow solely to a second cylinder; and
a controller including instructions for adjusting a position of the engine air intake throttle, the controller including further instructions for adjusting the first engine cylinder port throttle to a first position during an operator directed engine start, the controller also including instructions for adjusting the second engine cylinder port throttle to a second position during the operator directed engine start, the second position different from the first position.

16. The system of claim 15, further comprising an engine air intake throttle located along an engine air intake passage for regulating air flow to the first and second engine cylinder port throttles, and where the position of the engine air intake throttle is adjusted based on barometric pressure.

17. The system of claim 16, further comprising additional controller instructions for adjusting the first engine cylinder port throttle and the second engine cylinder port throttle to a same position after engine start.

18. The system of claim 17, further comprising additional controller instructions for adjusting the first engine cylinder port throttle and the second engine cylinder port throttle in response to engine speed and engine load after the first and second engine cylinder port throttles are adjusted to the same position.

19. The system of claim 15, where the controller includes further instructions for adjusting the first engine cylinder port throttle and the second engine cylinder port throttle to different positions in response to an automatic engine start.

20. The system of claim 19, where the controller includes further instructions for opening the first engine cylinder port throttle further during the operator directed start than during the automatic engine start.

* * * * *